United States Patent [19]

Soffa

[11] Patent Number: 5,343,993

[45] Date of Patent: Sep. 6, 1994

[54] SYNCHRONIZING DEVICE FOR TRANSMISSION ASSEMBLIES AND HAVING FRICTION-COUPLED ASSEMBLIES

[75] Inventor: Franz Soffa, Burggen, Fed. Rep. of Germany

[73] Assignee: Hoerbiger & Co., Schongau, Fed. Rep. of Germany

[21] Appl. No.: 67,395

[22] Filed: May 26, 1993

Related U.S. Application Data

[63] Continuation of Ser. No. 866,063, Apr. 10, 1992, abandoned.

[30] Foreign Application Priority Data

Apr. 10, 1991 [AT] Austria ................................ 753/91

[51] Int. Cl.$^5$ .................................................. F16D 23/04
[52] U.S. Cl. ........................................ 192/53 F; 192/107 M
[58] Field of Search ............................ 192/53 F, 107 M

[56] References Cited

U.S. PATENT DOCUMENTS

| | | | |
|---|---|---|---|
| 2,046,957 | 7/1936 | Manville | 192/53 F X |
| 3,175,412 | 3/1965 | Peras | 192/53 F |
| 3,347,347 | 10/1967 | Hetmann | 192/107 M |
| 4,267,912 | 5/1981 | Bauer et al. | 192/53 F |
| 4,641,734 | 2/1987 | Muller et al. | 192/53 F |
| 4,732,247 | 3/1988 | Frost | 192/53 F |
| 4,770,283 | 9/1988 | Pütz | 192/107 M |
| 4,811,825 | 3/1989 | Christian et al. | 192/53 F |

FOREIGN PATENT DOCUMENTS

| | | | |
|---|---|---|---|
| 385826 | 5/1988 | Austria . | |
| 3417813 | 6/1985 | Fed. Rep. of Germany . | |
| 1385960 | 12/1964 | France | 192/53 F |
| 125827 | 5/1988 | Japan | 192/53 F |
| 1073410 | 6/1967 | United Kingdom . | |

*Primary Examiner*—Andrea Pitts
*Attorney, Agent, or Firm*—Watson, Cole, Grindle & Watson

[57] ABSTRACT

In a synchronizing device for transmission assemblies, a gear shaft includes a detent mounted thereon in a twist-proof manner and at least one speed wheel cooperating with the detent and rotatable on the gear shaft by movement of a sliding sleeve. A clutch is connected in a shape-locking manner to the speed wheel and a synchronizing ring enabling engagable and disengagable friction coupling of the clutch with the detent. The synchronizing ring including a conically-shaped coupling surface and the friction coupling including a friction ring body subassembly with a conical friction surface having a sintered-on friction lining and cams, and is connected in a shape-locking manner by the cams to the clutch and interacts by means of the friction lining with the conical coupling surface.

2 Claims, 2 Drawing Sheets

SYNCHRONIZING DEVICE FOR TRANSMISSION ASSEMBLIES AND HAVING FRICTION-COUPLED ASSEMBLIES

This application is a continuation of application Ser. No. 866,063, filed Apr. 10, 1992 now abandoned.

BACKGROUND OF THE INVENTION

FIELD OF THE INVENTION

The invention relates to a synchronizing device for transmissions, in particular motor vehicles, and to Such synchronizing devices with a detent, which is mounted twist-proof on a gear shaft, with a sliding sleeve and at least one speed wheel, and cooperating with the detent to be rotatable on the gear shaft and which can be interconnected to be twist-proof with the detent by means of the sliding sleeve and with which a clutch is shape-lockingly connected. The clutch communicates through an engageable and disengageable friction coupling with the detent through a synchronizing ring, which is provided with a conical coupling surface.

RELATED ART

Some designs of the aforementioned kinds of synchronizing devices already exist. For example, the publication GB-PS 1 073 410 describes a model, where the conical coupling surface of the synchronizing ring is provided with a friction lining, i.e. with a molybdenum layer or another sprayed-on, non-iron-containing friction layer, and the clutch connected to the speed wheel includes an axially protruding annular shoulder with a conical coupling surface, which interacts with the friction lining of the synchronizing ring. However, such synchronizing devices are not always satisfactory in a given application, because it is expensive and difficult to apply a friction lining with suitable frictional properties on one of two interacting, conical coupling surfaces. Additionally, the known design itself is relatively expensive to manufacture, because the clutch connected to the speed wheel must have a correspondingly solid annular shoulder with the second conical coupling surface, wherein the clutch has a relatively complicated shape.

Recently it has occurred that synchronizing devices with friction surfaces, which exhibit a scatter sintering-friction lining, are the most suitable in practice and can also be manufactured in a relatively simple manner. The only difficulty lies in applying and reliably attaching the scatter-sintering friction lining on a conical coupling surface. As is well-known, sintered powders can be scattered and sintered only on flat surfaces.

A synchronizing device is known from the publication DE-PB 34 17 813, where the conical coupling surface of the synchronizing ring is provided with a scatter-sintering friction lining, sintered on a flat, relatively thin carrier plate, which is subsequently made into the shape of the conical coupling surface and is attached, e.g. soldered or welded, on the coupling surface. With this known design, advantageous frictional properties of the synchronizing ring with the scatter-sintering friction lining are still relatively expensive.

A simpler possibility for obtaining a scatter sintering friction lining for synchronizing clutches, brakes, and the like is already described in the publication AT-PS 385 826. There the friction linings are sintered directly on at least one cylindrical or conical rubbing surface of the friction ring body itself. The use of a carrier plate for the scatter-sintering friction lining is dispensed with. The friction ring body bearing the friction lining, or also two friction linings, forms its own subassembly. During the manufacture of the friction ring body one proceeds in such a manner that, first a flat ring body is manufactured, and then the scatter-sintering friction lining is applied and sintered on the ring body, whereupon the scatter-sintered friction ring body is reformed by stamping, deep drawing or the like, so that the scatter sintered friction surfaces are cylindrically or conically shaped.

This known friction ring body is suitable primarily for the so-called double synchronization, which is used for greater loads, e.g, in the lower gears of motor vehicle gear boxes, in truck gears or in highly stressed transmissions of other machines. Both the outside and the inside of the friction ring body exhibit scatter sintered friction surfaces, which interact with a conical coupling surface of the synchronizing and inner ring. By means of this double synchronization the synchronizing process is accelerated and the switching of the gears is facilitated. The only drawback is that two friction surfaces with friction linings and two coupling surfaces interacting therewith are mandatory, a feature that correspondingly increases the complexity of the design to obtain synchronization. In practice this complexity is not even necessary in many cases, e.g. with lower stress in the high gears of motor vehicle transmissions.

The invention is based on the problem of providing a less complicated synchronizing device, for which a single friction surface and a single related coupling surface suffice, while using the advantageous friction ring body with a scatter-sintering friction lining.

SUMMARY OF THE INVENTION

This problem with a synchronizing device of the aforementioned model is solved by the invention in that the friction coupling exhibits a friction ring body, which is provided on a conical friction surface with a sintered-on friction lining, forms its own subassembly, is connected in shape-locking relationship by means of cams to a clutch, and interacts by means of its friction lining with the conical coupling surface of the synchronizing ring. The synchronizing device according to the invention is characterized by its specific simplicity, even though the friction coupling used therein is equipped with a high quality scatter-sintering friction lining, which is also sintered directly on the friction surface without using carrier plates. Another special feature is that the friction ring body forming its/own subassembly communicates in shape-locking relationship by the clutch directly engaging with the speed wheel, whereas in the comparable, prior art synchronizing devices with simple synchronization the shape-locking connection does not take place until after the insertion or synchronization of the respective gear by means of the sliding sleeve. Since the clutch is designed in an especially simple manner and can be manufactured inexpensively, a material saving is also attained. Additionally, the friction ring body can be replaced in a simple and inexpensive manner, when necessary, e.g. due to wear or destruction of the friction surface. For the comparable, conventional synchronizing devices, in this case the speed wheel, including the clutch and friction cone, must be replaced.

In the case of the synchronizing device according to the invention the friction lining is provided expediently on the conical outer surface of the friction ring body. The opposing surface interacting with the friction lining is then situated on the synchronizing ring, so that even for the design of the invention the configuration of individual parts that is customary in synchronizing devices can be retained. In so doing, there is the possibility of converting existing synchronizing devices to the type of construction of the invention, or to take over individual components of known designs for the type of construction according to the invention.

For a preferred design of the invention the friction lining is a scatter-sintering friction lining. Within the scope of the invention, however, friction surfaces with other lining materials are also possible, e.g. molybdenumlinings or linings made of other sprayed-on materials.

In another embodiment of the invention the clutch or the speed wheel is designed without any friction surface and includes the manufacture of the coupling connection with the detent recesses for the shape-locking accommodation of the cams of the friction ring body. It involves a simply shaped and inexpensively manufacturable design of the clutch, which, according to the invention, can also be made as a simple precision blanking. The synchronizing device according to the invention brings with it not only advantages with respect to the components provided with the friction lining, but it also makes it possible to significantly simplify and reduce the cost of the adjoining components that interact therewith, a feature that directly benefits the gear manufacturer.

BRIEF DESCRIPTION OF THE DRAWINGS

The above featured, advantages and objects of the inventions are readily apparent from the following description of a preferred embodiment or the best mode of carrying-out the invention when taken in conjunctions with the drawings, whereas.

DETAILED DESCRIPTION

Figure 1:
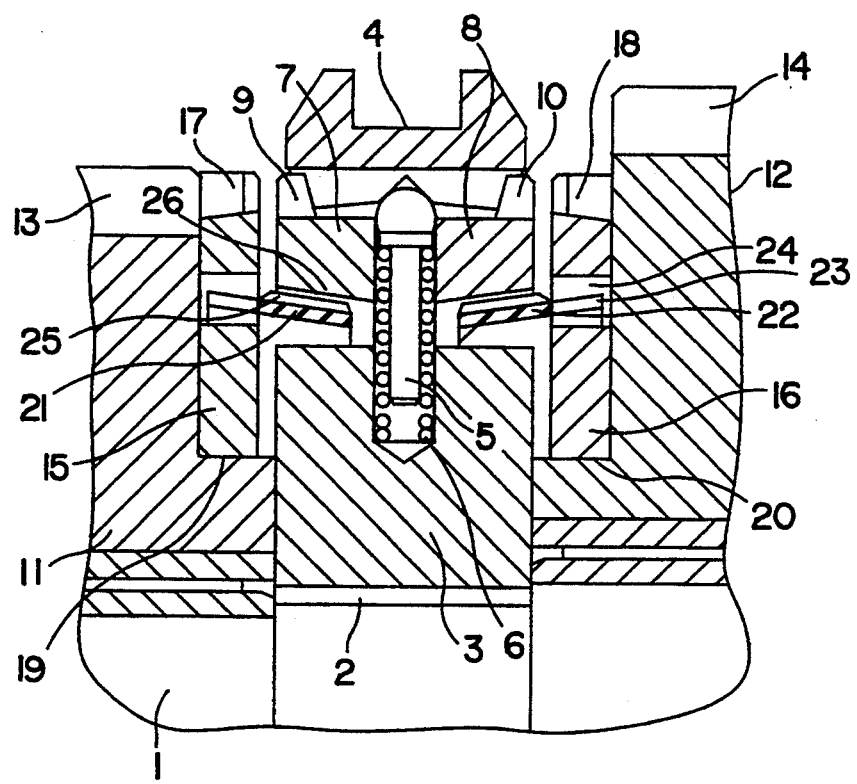
FIG. 1 is an axial central view of the upper half of the synchronizing device of the invention.

According to FIG. 1, the synchronizing device comprises a detent 3, arranged twist-proof on a gear shaft 1 by means of teeth 2. The detent is provided with a sliding sleeve 4, into which fits a non-illustrated shift lever and which is provided with a spring barrier consisting of a bolt 5 and a spring 6. On each of the two sides of the detent 3 is one synchronizing ring each 7 and 8, which are provided with a shape-locking driving element, e.g. teeth 9 and 10, with which the gearshift sleeve 4 mates.

On the gear shaft 1 speed wheels 11 and 12, each of which exhibits teeth 13 and 14, can be freely rotated on both sides of the detent 3. An annular clutch 15 and 16, each of which is also provided with teeth 17 and 18, with which the gearshift sleeve 4 can mate during its displacement, is connected in a twist-proof manner to each speed wheel 11, 12. Each of the two clutches 15, 16 rests in a twist-proof shape-locking and force-locking manner (e.g. teeth, laser welding, etc.) on a corresponding shoulder 19, 20 of the speed wheels 11 and 12.

Each of the two clutches 15, 16 communicates with the detent 3 by means of one engageable and disengageable friction coupling each. The friction coupling comprises one friction ring body each 21, 22, which forms its own subassembly and engages with cams 23 protruding on the one side in matching recesses 24 of the assigned clutch 15, 16. The cams 23 can project in a straight line into the conical surface of the friction ring body 21, 22, as shown in the drawing; however, it can also be bent e.g., at an approximately right angle towards the top, whereby the bent-over segment engages with the related recess 24 of the clutch 15, 16. On their conical outside surface, which forms a friction surface, the friction ring bodies 21, 22 are provided with a sintered-on friction lining 25, which interacts with the conical coupling surface 26 of the related synchronizing ring 7, 8.

Figure 2:
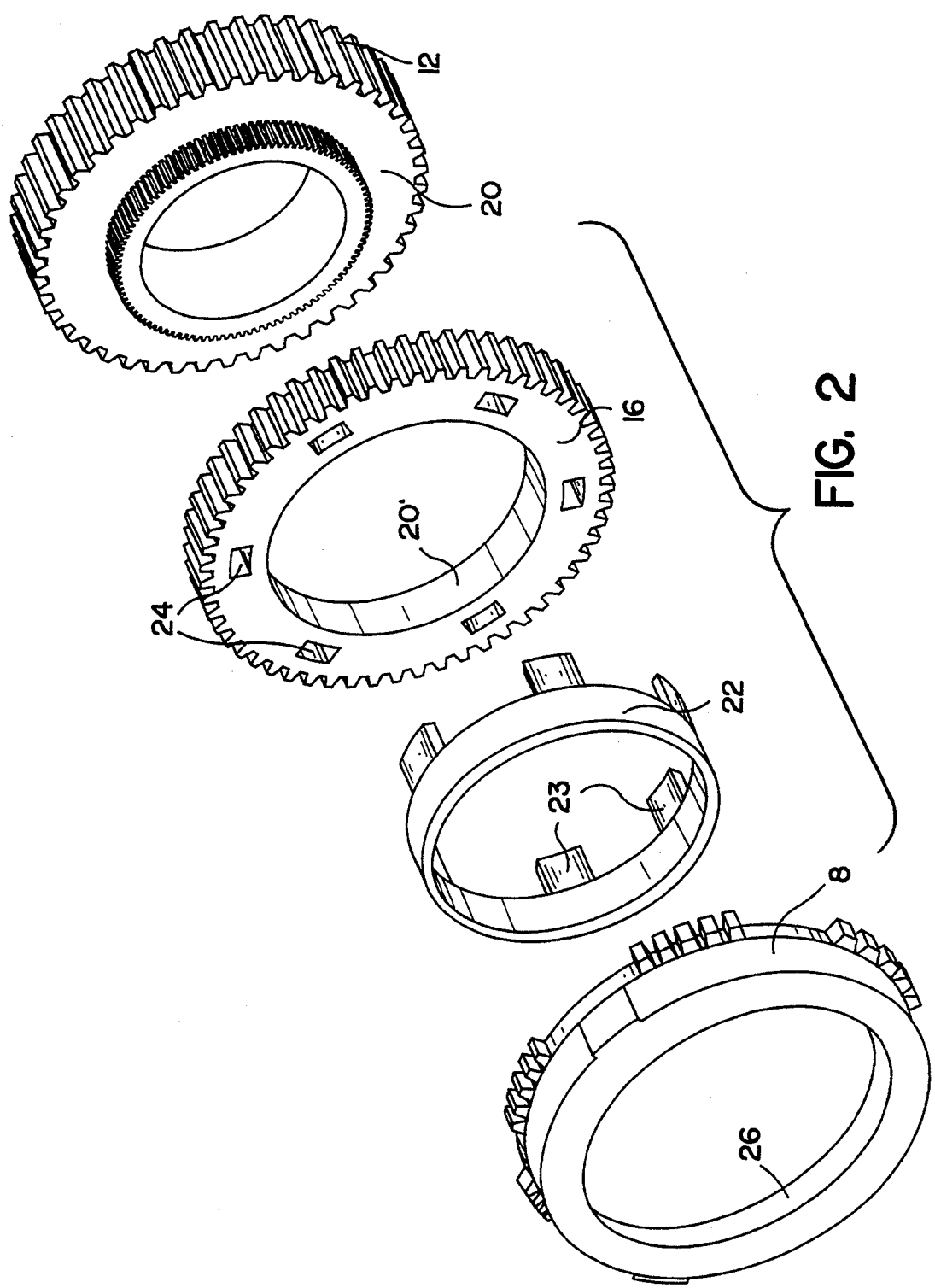
FIG. 2 is a full view of the components intended for the synchronization.

It is clear from FIG. 2, which is a full view of the right half of FIG. 1, how the individual components of a friction coupling of the synchronizing device are arranged within, and relative to, one another. The speed wheel 12, which can be freely rotated on the non-illustrated gear shaft 1 (FIG. 1), includes a shoulder 20, which projects against the clutch 16 and on which the clutch 16 is mounted in a twist-proof manner with its matching opposite surface 20. In this manner there is a lasting shape-locking and force-locking connection between the speed wheel 12 and the related clutch 16. The conical friction ring body 22 with cams 23 is inserted in a shape-lockingly manner into the recesses 24 of the clutch 16, so that there is also a virtually play-free rotary connection between these parts. The conical frictional surface of the friction ring body 22 that is provided with a scatter sintering friction lining 25 projects concentrically into the also conical coupling surface, as soon as the synchronizing ring 8 is moved by means of the sliding sleeve 4 against the friction ring body 22.

According to FIG. 1, the detent 3 rotates with the gear shaft 1, whereas the two speed wheels 11 and 12 can move freely relative to the gear shaft 1 and the detent 3. When, having overcome the barrier formed by the bolt 5 and the spring 6, the sliding sleeve 4 is moved against one of the speed wheels 11, 12 e.g. against speed wheel 11, then the sliding sleeve 4 carries the synchronizing ring 7, which, after a short displacement with coupling surface 26, strikes the friction surface of the friction ring body 21 that is provided with the, friction lining 25. The result is an adjustment of the speed of the synchronizing ring 7 and the speed wheel 11, and thus a synchronization between the two components. As soon as the speeds match, the sliding sleeve 4 can engage with the teeth 17 of the clutch 15 and thus produce a twist-proof connection between the synchronizing ring 7 and the speed wheel 11. The detent 3 and the speed wheel 12 in the right half of the drawing are connected in the same manner by moving the sliding sleeve 4 to the right.

It is clear from the drawing that the friction coupling provided to bring about the synchronization function is quite simple and consists virtually of only the friction ring body 21 or 22, provided with a scatter-sintering friction lining 25, as the important component. On the whole, only a few components are required, all of which have a simple shape, a feature that also applies to the synchronizing rings 7, 8 and in particular to the clutches 15, 16, which do not exhibit any friction or coupling surface. The force is transferred during synchronization over a short distance, wherein the friction ring body 21, 22 bearing the friction lining engages directly with the speed wheel 11, 12 by means of the clutch 15, 16. Thus, it involves a synchronizing device that is simple to manufacture and functions in an advantageous manner and that is especially suited for transmission gears of motor vehicles with the expectation of easy action switching and a long lifespan.

I claim:

1. Synchronizing device for transmission assemblies, comprising:
   a gear shaft having a detent mounted thereon in a twist-proof manner;
   a sliding sleeve and at least one speed wheel rotatable on said gear shaft to be interconnected in a twist-proof manner with said detent by movement of said sliding sleeve;
   a clutch connected in a shape-locking manner to said at least one speed wheel;
   a friction ring body assembly comprising a friction ring including a conically-shaped coupling surface having a sintered-on friction lining and cams for providing engageable and disengageable friction coupling of said clutch with said detent by engagement of said cams with said clutch, said friction ring body assembly further comprising at least one synchronizing ring engageable with said sliding sleeve and including a conically-shaped coupling surface engageable with said friction lining with movement of said sliding sleeve, and wherein said clutch or the speed wheel includes a frictionless surface and recesses for the coupling connection with said detent and the shape-locking accomodation of said cams of said friction ring body assembly.

2. The synchronizing device according to claim 1, wherein said friction lining is a scatter-sintering friction lining.

* * * * *